United States Patent
Brown

(10) Patent No.: US 6,372,864 B1
(45) Date of Patent: Apr. 16, 2002

(54) DUAL REACTOR POLYETHYLENE PROCESS USING A PHOSPHINIMINE CATALYST

(75) Inventor: Stephen John Brown, Calgary (CA)

(73) Assignee: NOVA Chemicals (International) S.A., Villars-sur-Glane (CH)

( * ) Notice: Subject to any disclaimer, the term of this patent is extended or adjusted under 35 U.S.C. 154(b) by 0 days.

(21) Appl. No.: 09/702,570

(22) Filed: Oct. 31, 2000

Related U.S. Application Data

(63) Continuation of application No. 09/364,703, filed on Jul. 30, 1999, now abandoned.

(30) Foreign Application Priority Data

Aug. 19, 1998 (CA) .............................................. 2245375

(51) Int. Cl.[7] .............................. C08F 2/01; C08F 4/44; C08F 4/16
(52) U.S. Cl. .......................... 526/65; 526/127; 526/160; 526/161; 526/943; 502/152; 502/155
(58) Field of Search .......................... 526/65, 127, 160, 526/161; 502/152, 155

(56) References Cited

U.S. PATENT DOCUMENTS

| | | |
|---|---|---|
| 4,530,914 A | 7/1985 | Ewen et al. ................ 502/113 |
| 4,659,685 A | 4/1987 | Coleman, III et al. ...... 502/113 |
| 4,701,432 A | 10/1987 | Welborn, Jr. ................. 502/113 |
| 5,132,380 A | 7/1992 | Stevens et al. .............. 526/126 |
| 5,145,818 A | 9/1992 | Tsutsui et al. .............. 502/113 |
| 5,198,401 A | 3/1993 | Turner et al. ............... 502/155 |
| 5,395,810 A | 3/1995 | Shamshoum et al. ....... 502/113 |
| 5,434,116 A | 7/1995 | Sone et al. ................. 502/103 |
| 5,554,775 A | 9/1996 | Krishnamurti et al. ......... 556/7 |
| 5,589,555 A | 12/1996 | Zboril et al. ................... 526/64 |
| 5,594,078 A | 1/1997 | Welch et al. ................ 526/119 |
| 5,614,456 A | 3/1997 | Mink et al. ................. 502/115 |
| 5,637,659 A | 6/1997 | Krishnamurti et al. ...... 526/133 |
| 5,648,428 A | 7/1997 | Reddy et al. ............... 526/116 |
| 5,767,031 A | 6/1998 | Shamshoum et al. ....... 502/104 |
| 6,063,879 A * | 5/2000 | Stephan et al. ............. 526/127 |

\* cited by examiner

Primary Examiner—David W. Wu
Assistant Examiner—R. Harlan
(74) Attorney, Agent, or Firm—Kenneth H. Johnson

(57) ABSTRACT

A dual reactor process for the solution (co)polymerization of ethylene uses a catalyst having a phosphinimine ligand in each of the two reactors. In a preferred embodiment, the two reactors are operated at different temperatures and/or with different cocatalyst systems (such as "alumoxanes" and "ionic activators") for the preparation of linear low density polyethylene ("LLPDE") having a broad molecular weight distribution. Certain LLDPE polymers of this invention have an outstanding balance of physical properties (high dart impact strength and tear strength) excellent optical properties and excellent processability.

5 Claims, No Drawings

DUAL REACTOR POLYETHYLENE PROCESS USING A PHOSPHINIMINE CATALYST

This is a continuation, of application Ser. No. 09/364,703, filed Jul. 30, 1999. Now abandoned.

FIELD OF THE INVENTION

This invention relates to the solution polymerization of ethylene in two reactors using a catalyst having a phosphinimine ligand.

BACKGROUND OF THE INVENTION

The use of so-called "single-site" catalysts such as metallocene catalysts to prepare polyethylene having a narrow molecular weight distribution is well known. In addition, "linear low density polyethylene" (or "LLDPE", a copolymer of ethylene and a higher alpha olefin) prepared with such catalysts typically exhibits a very uniform composition distribution (i.e. the comonomer is very uniformly distributed within the polymer chains). The combination of narrow molecular weight distribution and uniform composition distribution distinguishes these polymers from "conventional" LLDPE which is commercially manufactured with a Ziegler Natta catalyst or a chromium catalyst. In particular, the conventional LLDPE products have a broad molecular weight distribution and a broad composition distribution. These compositional differences are manifested in the form of differences in the physical properties of the two types of LLDPE polymers. Most notably, LLDPE prepared with a single site catalyst has improved dart impact strength and optical properties in comparison to "conventional" LLDPE. However, the "conventional" LLDPE is usually easier to "process" in its existing mixing and extrusion equipment. Accordingly, it would be highly desirable to prepare LLDPE products which possess the improved physical properties offered by single site catalysts and also exhibit processability characteristics which are similar to those of conventional LLDPE.

One approach which has been used to achieve this object is the use of mixed catalyst systems in a single reactor. For example, U.S. Pat. No. 4,530,914 (Ewen et al, to Exxon) teaches the use of two different metallocenes and U.S. Pat. No. 4,701,432 (Welborm, to Exxon) teaches the use of a supported catalyst prepared with a metallocene catalyst and a Ziegler Natta catalyst. Many others have subsequently attempted to use similar mixed catalyst systems as described in U.S. Pats. No. 5,767,031; 5,594,078; 5,648,428; 4,659,685; 5,145,818; 5,395,810; and 5,614,456.

However, the use of "mixed" catalyst systems is generally associated with operability problems. For example, the use of two catalysts on a single support (as taught by Welborm in U.S. Pat. No. 4,701,432) may be associated with a reduced degree of process control flexibility (e.g. If the polymerization reaction is not proceeding as desired when using such a catalyst system, then it is difficult to establish which corrective action should be taken as the corrective action will typically have a different effect on each of the two different catalyst components). Moreover, the two different catalyst/cocatalyst systems may interfere with one another—for example, the organoaluminum component which is often used in Ziegler Natta or chromium catalyst systems may "poison" a metallocene catalyst.

Another alternative is to use two different metallocene catalysts in two different polymerization reactors. However, process control problems relating to interactions between the two different catalysts might also be anticipated in such a process. Accordingly, a "dual reactor" process which mitigates some of these problems would be a useful addition to the art.

SUMMARY OF THE INVENTION

The present invention provides a medium pressure solution polymerization process characterized by:

A) polymerizing ethylene, optionally with one or more $C_{3-12}$ alpha olefins, in solvent in a first stirred polymerization reactor at a temperature of from 80 to 200° C. and a pressure of from 1500 to 5000 pounds per square inch gauge (psi) in the presence of (a) a catalyst which is an organometallic complex of a group 3, 4 or 5 metal, characterized by having at least one phosphinimine ligand; and (b) a cocatalyst which contains an alumoxane; then B) passing said first polymer solution into a second stirred polymerization reactor and polymerizing ethylene, optionally with one or more $C_{3-12}$ alpha olefins, in said second stirred polymerization reactor in the presence of (a) a catalyst which is an organometallic complex of a group 3, 4 or 5 metal, characterized by having at least one phosphinimine ligand; and (b) a cocatalyst which contains an ionic activator.

Thus, the process of the present invention requires two solution polymerization reactors and a catalyst having a phosphinimine ligand ("phosphinimine catalyst").

Preferred catalysts are titanium complexes which contain one cyclopentadienyl ligand, one phosphinimine ligand and two chloride ligands. The same phosphinimine catalyst may be used in both reactors or, alternatively, a different type of phosphinimine catalyst may be used in the two reactors. It is preferred to use the same catalyst in both reactors. Preferred co-catalysts are selected from a boron-containing "ionic activators" and alumoxanes.

Thus, in the present process, the cocatalyst system used in the first reactor must be different from the cocatalyst system used in the second reactor. In addition, it is preferred that polymerization temperature in the second reactor is different than the polymerization temperature of the first reactor.

Most preferably, the second polymerization reactor is operated at a higher temperature than the first (ideally at least 25° C. higher than the first).

Certain LLDPE polymers produced according to the preferred process of this invention exhibit an outstanding balance of physical properties, optical properties and "processability". As will be recognized by those skilled in the art, this balance of characteristics is highly desirable for the production of LLDPE film. Thus, the present invention also provides a LLDPE film having a dart impact strength as determined by ASTM D-1709 of greater than 700 grams/mil, a haze as determined by ASTM D-1003 of less that 6%, a 45° gloss as determined by ASTM D-2457 of greater that 65% and a machine direction tear resistance as determined by ASTM D-1922 of greater than 300 grams/mil.

DETAILED DESCRIPTION OF PREFERRED EMBODIMENTS

Part 1. Description of Catalysts

The catalyst used in the process of this invention is an organometallic complex of a group 3, 4 or 5 metal which is characterized by having at least one phosphinimine ligand (where the term phosphinimine is defined in section 1.2 below).

Any such organometallic having a phosphinimine ligand which displays catalytic activity for ethylene polymerization may be employed. Preferred catalysts are defined by the formula:

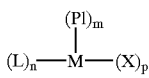

wherein M is a transition metal selected from Ti, Hf and Zr (as described in section 1.1 below); PI is a phosphinimine ligand (as described in section 1.2 below); L is a monoanionic ligand which is a cyclopentadienyl-type ligand or a bulky heteroatom ligand (as described in section 1.3 below); X is an activatable ligand which is most preferably a simple monoanionic ligand such as alkyl or a halide (as described in section 1.4 below); M is 1 or 2, n is 0 or 1, and p is fixed by the valence of the metal M.

The most preferred first catalysts are group 4 metal complexes in the highest oxidation state. For example, a preferred catalyst may be a bis(phosphinimine) dichloride complex of titanium, zirconium or hafnium. However, it is preferred that the first catalyst contain one phosphinimine ligand, one "L" ligand (which is most preferably a cyclopentadienyl-type ligand) and two "X" ligands (which are preferably both chloride).

1.1 Metals

The catalyst is an organometallic complex of a group 3, 4 or 5 metal (where the numbers refer to columns in the Periodic Table of the Elements using IUPAC nomenclature). The preferred metals are from group 4, (especially titanium, hafnium or zirconium) with titanium being most preferred.

1.2 Phosphinimine Ligand

The first catalyst must contain a phosphinimine ligand which is covalently bonded to the metal. This ligand is defined by the formula:

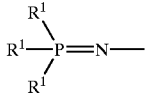

wherein each $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, an amido radical, a silyl radical of the formula:

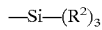

wherein each $R^2$ is independently selected from the group consisting of hydrogen, a $C_{1-8}$ alkyl or alkoxy radical, $C_{6-10}$ aryl or aryloxy radicals, and a germanyl radical of the formula:

wherein $R^2$ is as defined above.

The preferred phosphinimines are those in which each $R^1$ is a hydrocarbyl radical. A particularly preferred phosphinimine is tri-(tertiary butyl)phosphinimine (i.e. where each $R^1$ is a tertiary butyl group).

1.3 Ligand L

Preferred first catalysts are group 4 organometallic complexes which contain one phosphinimine ligand (as described in section 1.2 above) and one ligand L (as described in sections 1.3.1 to 1.3.6) which is either a cyclopentadienyl-type ligand or a heteroligand.

1.3.1 Cyclopentadienyl-type Ligands

As used herein, the term cyclopentadienyl-type ligand is meant to convey its conventional meaning, namely a ligand having a five carbon ring which is bonded to the metal via eta-5 bonding. Thus, the term "cyclopentadienyl-type" includes unsubstituted cyclopentadienyl, substituted cyclopentadienyl, unsubstituted indenyl, substituted indenyl, unsubstituted fluorenyl and substituted fluorenyl. An exemplary list of substituents for a cyclopentadienyl ligand includes the group consisting of $C_{1-10}$ hydrocarbyl radical (which hydrocarbyl substituents are unsubstituted or further substituted); a halogen atom, $C_{1-8}$ alkoxy radical, a $C_{1-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R)_3$ wherein each R is independently selected from the group consisting of hydrogen, a $C_{1-8}$ alkyl or alkoxy radical $C_{6-10}$ aryl or aryloxy radicals; germanyl radicals of the formula Ge—$(R)_3$ wherein R is as defined directly above.

1.3.2 Heteroligand

As used herein, the term "heteroligand" refers to a ligand which contains at least one heteroatom selected from the group consisting of boron, nitrogen, oxygen, phosphorus or sulfur. The heteroligand may be sigma or pi-bonded to the metal. Exemplary heteroligands are described in sections 1.3.2.1 to 1.3.2.6 below.

1.3.2.1 Ketimide Ligands

As used herein, the term "ketimide ligand" refers to a ligand which: (a) is bonded to the transition metal via a metal-nitrogen atom bond; (b) has a single substituent on the nitrogen atom, (where this single substituent is a carbon atom which is doubly bonded to the N atom); and (c) has two substituents (Sub 1 and Sub 2, described below) which are bonded to the carbon atom.

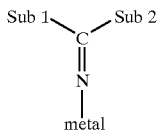

The substituents "Sub 1 and Sub 2" may be the same or different. Exemplary substituents include hydrocarbyls having from 1 to 20 carbon atoms; silyl groups, amido groups and phosphido groups. For reasons of cost and convenience it is preferred that these substituents both be hydrocarbyls, especially simple alkyls and most preferably tertiary butyl.

1.3.2.2 Silicone-Containing Heteroligands

These ligands are defined by the formula:

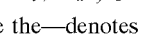

where the—denotes a bond to the transition metal and $\mu$ is sulfur or oxygen.

The substituents on the Si atom, namely $R_x$, $R_y$ and $R_z$ are required in order to satisfy the bonding orbital of the Si atom. The use of any particular substituent $R_x$, $R_y$ or $R_z$ is not especially important to the success of this invention. It is preferred that each of $R_x$, $R_y$ and $R_z$ is a $C_{1-2}$ hydrocarbyl group (i.e. methyl or ethyl) simply because such materials are readily synthesized from commercially available materials).

1.3.2.3 Amido Ligands

The term "amido" is meant to convey its broad, conventional meaning. Thus, these ligands are characterized by (a) a metal-nitrogen bond, and (b) the presence of two substituents (which are typically simple alkyl or silyl groups) on the nitrogen atom.

1.3.2.4 Alkoxy Ligands

The term "alkoxy" is also intended to convey its conventional meaning. Thus these ligands are characterized by (a) a metal oxygen bond, and (b) the presence of a hydrocarbyl group bonded to the oxygen atom. The hydrocarbyl group may be a ring structure and/or substituted (e.g. 2,6 di-tertiary butyl phenoxy).

1.3.2.5 Boron Heterocyclic Ligands

These ligands are characterized by the presence of a boron atom in a closed ring ligand. This definition includes heterocyclic ligands which also contain a nitrogen atom in the ring. These ligands are well known to those skilled in the art of olefin polymerization and are fully described in the literature (see, for example, U.S. Pat. Nos. 5,637,659; 5,554,775 and the references cited therein).

1.3.2.6 Phosphole Ligands

The term "phosphole" is also meant to convey its conventional meaning. "Phospholes" are cyclic dienyl structures having four carbon atoms and one phosphorus atom in the closed ring. The simplest phosphole is $C_4PH_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; silyl or alkoxy radicals. Phosphole ligands are also well known to those skilled in the art of olefin polymerization and are described as such in U.S. Pat. No. 5,434,116 (Sone, to Tosoh).

1.4 Activatable Ligand

The term "activatable ligand" refers to a ligand which may be activated by a cocatalyst, (also referred to as an "activator"), to facilitate olefin polymerization. Exemplary activatable ligands are independently selected from the group consisting of a hydrogen atom, a halogen atom, a $C_{1-10}$ hydrocarbyl radical, a $C_{1-10}$ alkoxy radical, a $C_{5-10}$ aryl oxide radical; each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals; a phosphido radical which is unsubstituted or substituted by up to two $C_{1-8}$ alkyl radicals.

The number of activatable ligands depends upon the valency of the metal and the valency of the activatable ligand. The preferred catalyst metals are group 4 metals in their highest oxidation state (i.e. 4+) and the preferred activatable ligands are monoanionic (such as a halide—especially chloride or a alkyl—especially methyl). Thus, the preferred catalyst contain a phosphinimine ligand, a cyclopentadienyl ligand and two chloride (or methyl) ligands bonded to the group 4 metal. In some instances, the metal of the catalyst component may not be in the highest oxidation state. For example, a titanium (III) component would contain only one activatable ligand.

1.5 Summary Description of Preferred Catalyst

As previously noted, the preferred catalyst is a group 4 organometallic complex in its highest oxidation state having a phosphinimine ligand, a cyclopentadienyl-type ligand and two activatable ligands. These requirements may be concisely described using the following formula for the preferred catalyst:

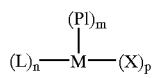

wherein: (a) M is a metal selected from Ti, Hf and Zr; (b) PI is a phosphinimine ligand defined by the formula:

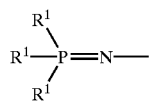

wherein each $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, an amido radical, a silyl radical of the formula:

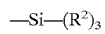

wherein each $R^2$ is independently selected from the group consisting of hydrogen, a $C_{1-8}$ alkyl or alkoxy radical, $C_{6-10}$ aryl or aryloxy radicals, and a germanyl radical of the formula:

wherein $R^2$ is as defined above; (c) L is a ligand selected from the group consisting of cyclopentadienyl, substituted cyclopentadienyl, indenyl, substituted indenyl, fluorenyl, substituted fluorenyl; (d) X is an activatable ligand, and wherein: m is 1, n is 1 and p is 2.

2. Description of Cocatalyst

The catalyst components described in part 1 above are used in combination with at least one cocatalyst (or "activator") to form an active catalyst system for olefin polymerization as described in more detail in sections 2.1, 2.2 and 2.3 below.

2.1 Alumoxanes

The alumoxane may be of the formula:

wherein each $R^4$ is independently selected from the group consisting of $C_{1-20}$ hydrocarbyl radicals and m is from 0 to 50, preferably $R^4$ is a $C_{1-4}$ alkyl radical and m is from 5 to 30. Methylalumoxane (or "MAO") in which each R is methyl is the preferred alumoxane.

Alumoxanes are well known as cocatalysts, particularly for metallocene-type catalysts. Alumoxanes are also readily available articles of commerce.

The use of an alumoxane cocatalyst generally requires a molar ratio of aluminum to the transition metal in the catalyst from 20:1 to 1000:1. Preferred ratios are from 50:1 to 250:1.

2.2 "Ionic Activators" Cocatalysts

So-called "ionic activators" are also well known for metallocene catalysts. See, for example, U.S. Pat. No. 5,198,401 (Hlatky and Turner) and U.S. Pat. No. 5,132,380 (Stevens and Neithamer).

Whilst not wishing to be bound by any theory, it is thought by those skilled in the art that "ionic activators" initially cause the abstraction of one or more of the activatable ligands in a manner which ionizes the catalyst into a cation, then provides a bulky, labile, non-coordinating anion which stabilizes the catalyst in a cationic form. The bulky, non-coordinating anion permits olefin polymerization to proceed at the cationic catalyst center (presumably because the non-coordinating anion is sufficiently labile to be displaced by monomer which coordinates to the catalyst. Preferred ionic activators are boron-containing ionic activators described in (i)–(iii) below:

(i) compounds of the formula [R$^5$]$^+$[B(R$^7$)$_4$]$^-$ wherein B is a boron atom, R$^5$ is a aromatic hydrocarbyl (e.g. triphenyl methyl cation) and each R$^7$ is independently selected from the group consisting of phenyl radicals which are unsubstituted or substituted with from 3 to 5 substituents selected from the group consisting of a fluorine atom, a C$_{1-4}$ alkyl or alkoxy radical which is unsubstituted or substituted by a fluorine atom; and a silyl radical of the formula —Si—(R$^9$)$_3$; wherein each R$^9$ is independently selected from the group consisting of a hydrogen atom and a C$_{1-4}$ alkyl radical; and (ii) compounds of the formula [(R$^8$)$_t$ZH]$^+$[B(R$^7$)$_4$]$^-$ wherein B is a boron atom, H is a hydrogen atom, Z is a nitrogen atom or phosphorus atom, t is 2 or 3 and R$^8$ is selected from the group consisting of C$_{1-8}$ alkyl radicals, a phenyl radical which is unsubstituted or substituted by up to three C$_{1-4}$ alkyl radicals, or one R$^8$ taken together with the nitrogen atom may form an anilinium radical and R$^7$ is as defined above; and (iii) compounds of the formula B(R$^7$)$_3$ wherein R$^7$ is as defined above.

In the above compounds preferably R$^7$ is a pentafluorophenyl radical, and R$^5$ is a triphenylmethyl cation, Z is a nitrogen atom and R$^8$ is a C$_{1-4}$ alkyl radical or R$^8$ taken together with the nitrogen atom forms an anilinium radical which is substituted by two C$_{1-4}$ alkyl radicals.

The "ionic activator" may abstract one or more activatable ligands so as to ionize the catalyst center into a cation but not to covalently bond with the catalyst and to provide sufficient distance between the catalyst and the ionizing activator to permit a polymerizable olefin to enter the resulting active site.

Examples of ionic activators include:
triethylammonium tetra(phenyl)boron,
tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tripropylammonium tetra(o,p-dimethylphenyl)boron,
tributylammonium tetra(m,m-dimethylphenyl)boron,
tributylammonium tetra(p-trifluoromethylphenyl)boron,
tributylammonium tetra(pentafluorophenyl)boron,
tri(n-butyl)ammonium tetra(o-tolyl)boron,
N,N-dimethylanilinium tetra(phenyl)boron,
N,N-dimethylanilinium tetra(phenyl)boron,
N,N-diethylanilinium tetra(phenyl)n-butylboron,
N,N-2,4,6-pentamethylanilinium tetra(phenyl)boron,
di-(isopropyl)ammonium tetra(pentafluorophenyl)boron,
dicyclohexylammonium tetra(phenyl)boron,
triphenylphosphonium tetra(phenyl)boron,
tri(methylphenyl )phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
benzene(diazonium)tetrakispentafluorophenyl borate,
tropillium phenyltrispentafluorophenyl borate,
triphenylmethylium phenyltrispentafluorophenyl borate,
benzene(diazonium)phenyltrispentafluorophenyl borate,
tropillium tetrakis(2,3,5,6-tetrafluorophenyl)borate,
triphenylmethylium tetrakis(2,3,5,6-tetrafluorophenyl) borate,
benzene (diazonium)tetrakis(3,4,5-trifluorophenyl)borate,
tropillium tetrakis(3,4,5-trifluorophenyl)borate,
benzene(diazonium)tetrakis(3,4,5-trifluorophenyl)borate,
tropillium tetrakis(1,2,2-trifluoroethenyl)borate,
triphenylmethylium tetrakis(1,2,2-trifluoroethenyl)borate,
benzene(diazonium)tetrakis(1,2,2-trifluoroethenyl) borate,
tropillium tetrakis(2,3,4,5-tetrafluorophenyl)borate,
triphenylmethylium tetrakis(2,3,4,5-tetrafluorophenyl) borate, and
benzene(diazonium)tetrakis(2,3,4,5-tetrafluorophenyl) borate.

Readily commercially available ionic activators include:
N,N-dimethylaniliumtetrakispentafluorophenyl borate,
triphenylmethylium tetrakispentafluorophenyl borate, and
trispentafluorophenyl borane.

2.3 Cocatalyst Systems

An alumoxane must be used in the first reactor and an ionic activator must be used in the second reactor. However, it is permissible to use both of an alumoxane and an ionic activator in either reactor, so the term "cocatalyst system" is used to convey this option. In particular, it is preferred to use alumoxane in both reactors as alumoxanes are generally regarded as very good "poison scavengers" (i.e. the alumoxanes are thought to mitigate the deleterious effects of contaminants which may be present in the reactor).

The cocatalyst systems used in the two reactors are different. If a boron-containing "ionic activator" and alumoxane are used in both reactors, it is possible to satisfy the requirement that different cocatalyst systems in the two reactors by using different mole ratios of the two catalysts in the two reactors (as is illustrated in the Examples). We have discovered that the use of different cocatalyst systems in the reactors provides process control options which may be readily used by persons skilled in the art to vary the MWD of polymers produced by the inventive process.

3. Description of Dual Reactor Solution Polymerization Process

Solution processes for the (co)polymerization of ethylene are well known in the art. These processes are conducted in the presence of an inert hydrocarbon solvent typically a C$_{5-12}$ hydrocarbon which may be unsubstituted or substituted by a C$_{1-4}$ alkyl group, such as pentane, methyl pentane, hexane, heptane, octane, cyclohexane, methylcyclohexane and hydrogenated naphtha. An example of a suitable solvent which is commercially available is "Isopar E" (C$_{8-12}$ aliphatic solvent, Exxon Chemical Co.).

The solution polymerization process of this invention must use at least two polymerization reactors. The first polymerization reactor preferably operates at a lower temperature ("cold reactor") using a "phosphinimine catalyst" described in Part 1 above.

The polymerization temperature in the first reactor is from about 80° C. to about 180° C. (preferably from about 120° C. to 160° C.) and the hot reactor is preferably operated at a higher temperature (up to about 220° C.). The most preferred reaction process is a "medium pressure process", meaning that the pressure in each reactor is preferably less than about 6,000 psi (about 42,000 kilopascals or kPa), most preferably from about 2,000 psi to 3,000 psi (about 14,000–22,000 kPa)

Suitable monomers for copolymerization with ethylene include C$_{3-20}$ mono- and di-olefins. Preferred comonomers include C$_{3-12}$ alpha olefins which are unsubstituted or substituted by up to two C$_{1-6}$ alkyl radicals, C$_{8-12}$ vinyl aromatic monomers which are unsubstituted or substituted by up to two substituents selected from the group consisting of C$_{1-4}$ alkyl radicals, C$_{4-12}$ straight chained or cyclic diolefins which are unsubstituted or substituted by a C$_{1-4}$ alkyl radical. Illustrative non-limiting examples of such alpha-olefins are one or more of propylene, 1-butene, 1-pentene, 1-hexene, 1-octene and 1-decene, styrene, alpha methyl styrene, and the constrained-ring cyclic olefins such as cyclobutene, cyclopentene, dicyclopentadiene norbornene, alkyl-substituted norbornes, alkenyl-substituted norbornes and the like (e.g. 5-methylene-2-norbornene and 5-ethylidene-2-norbornene, bicyclo-(2,2,1)-hepta-2,5-diene).

The polyethylene polymers which may be prepared in accordance with the present invention are LLDPE's which typically comprise not less than 60, preferably not less than 75 weight % of ethylene and the balance one or more $C_{4-10}$ alpha olefins, preferably selected from the group consisting of 1-butene, 1-hexene and 1-octene. The polyethylene prepared in accordance with the present invention may be LLDPE having a density from about 0.910 to 0.935 g/cc or (linear) high density polyethylene having a density above 0.935 g/cc. The present invention might also be useful to prepare polyethylene having a density below 0.910 g/cc— the so-called very low and ultra low density polyethylenes.

Generally the alpha olefin may be present in an amount from about 3 to 30 weight %, preferably from about 4 to 25 weight %.

The present invention may also be used to prepare co- and ter-polymers of ethylene, propylene and optionally one or more diene monomers. Generally, such polymers will contain about 50 to about 75 weight % ethylene, preferably about 50 to 60 weight % ethylene and correspondingly from 50 to 25 weight % of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene, especially 5-ethylidene-2-norbornene and 1,4-hexadiene.

The monomers are dissolved/dispersed in the solvent either prior to being fed to the first reactor (or for gaseous monomers the monomer may be fed to the reactor so that it will dissolve in the reaction mixture). Prior to mixing, the solvent and monomers are generally purified to remove potential catalyst poisons such as water, oxygen or metal impurities. The feedstock purification follows standard practices in the art, e.g. molecular _ sieves, alumina beds and oxygen removal catalysts are used for the purification of monomers. The solvent itself as well (e.g. methyl pentane, cyclohexane, hexane or toluene) is preferably treated in a similar manner.

The feedstock may be heated or cooled prior to feeding to the first reactor. Additional monomers and solvent may be added to the second reactor, and it may be heated or cooled.

Generally, the catalyst components may be premixed in the solvent for the reaction or fed as separate streams to each reactor. In some instances premixing it may be desirable to provide a reaction time for the catalyst components prior to entering the reaction. Such an "in line mixing" technique is described in a number of patents in the name of DuPont Canada Inc (e.g. U.S. Pat No. 5,589,555, issued Dec. 31, 1996).

The residence time in each reactor will depend on the design and the capacity of the reactor. Generally the reactors should be operated under conditions to achieve a thorough mixing of the reactants. In addition, it is preferred that from 20 to 60 weight % of the final polymer is polymerized in the first reactor, with the balance being polymerized in the second reactor. On leaving the reactor system the solvent is removed and the resulting polymer is finished in a conventional manner.

In a highly preferred embodiment, the first polymerization reactor has a smaller volume than the second polymerization reactor. In addition, the first polymerization reactor is preferably operated at a colder temperature than the second reactor. Certain LLDPE polymers produced under these highly preferred conditions have outstanding properties. In particular, the ethylene-octane type LLDPE polymers illustrated in the following examples have excellent impact strength and tear, whilst still retaining good optical properties (which are typically associated with LLDPE prepared using metallocene catalysts) and exhibiting good processability (often associated with LLDPE produced using conventional Ziegler Natta catalysts).

EXAMPLES

The examples illustrate the continuous solution copolymerization of ethylene and octane and medium pressure. The inventive examples used a first reactor which operated at a relatively low temperature (see Table 1). The first reactor pressure was about 17,000 kPa (about $2.5 \times 10^3$ psi), and the second reactor pressure was marginally lower (to facilitate flow from the first to second reactor). The contents from this reactor flowed into a larger, second polymerization reactor. (In a comparative experiment, only the second polymerization reactor was used).

The first reactor had a volume of 12 liters and the second reactor had a volume of 24 liters. Both reactors were agitated to ensure good mixing of the reactor contents.

The process was continuous in all feed streams (i.e. solvent, which was methyl pentane; monomers and catalyst systems) and in the removal of product monomer were purified prior to addition to the reactor using conventional feed preparation systems (such as contact with various absorption media to remove impurities such as water, oxygen and polar contaminants).

The reactor feeds were pumped to the reactors at the flow rates shown in Table 1. Ethylene and octane flows are described directly (kg/hr) and the total feed (kg/hr) further includes the solvent.

The catalyst used in all experiments was a titanium (IV) complex having one cyclopentadienyl ligand, two chloride ligands and one tri (tertiary butyl)phosphinimine ligand (referred to in Table 1 as "CpTiNP($^t$Bu)$_3$Cl$_2$"). The amount of catalyst feed to the reactor (expressed as moles of titanium) is shown in Table 1.

The cocatalysts were commercially available alumoxanes and a commercially available borate. More specifically, an isobutylalumoxane (purchased from Akzo-Nobel, under the tradename "IBAO-65", referred to in Table 1 as "IBAO") was used in experiment 1-C; a methylalumoxane (purchased from Akzo-Nobel, under the tradename "MMAO-7", referred to in Table 1 as "MAO") was used in experiments 2, 3 and 4 and triphenylmethylium tetrakispentafluorophenyl borate (purchased from Asahi Glass; referred to in Table 1 as "Ph$_3$CB(C$_6$F$_5$)$_4$") was used in all experiments. The amount of alumoxane and borate fed to each reactor is shown in Table 1 and is expressed as a mole ratio basis relative to the titanium contained in the catalyst. (For clarification, Table 1 shows that experiment 2 was conducted with a titanium concentration of 0.35 micromole in Reactor 1, with sufficient alumoxane to provide an Al/Ti ratio of 80/1 and sufficient borate to provide a B/Ti ratio of 0.65/1).

Physical properties of the resulting LLDPE products are shown in Table 2. Table 2 also contains comparative data from a commercially available ethylene-octane LLDPE (produced with a conventional Ziegler Natta catalyst, sold under the tradename SCLAIR 11 L 1 by NOVA Chemicals Ltd.

Polymer properties were measured using test methods described below:

Melt index ("MI") measurements are conducted according to ASTM method D-1238.

Polymer densities are measured using ASTM D-1928.

Molecular weights were analyzed by gel permeation chromatography (GPC), using an instrument sold under the tradename "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw").

Film properties were measured using the following test methods:

| | |
|---|---|
| Haze | (ASTM D-1003); |
| Gloss | (ASTM D-2457); |
| MD Tear and TD Tear Resistance | (ASTM D-1922); and |
| Dart Impact Strength | (ASTM D-1709). |

TABLE 1

| Experiment | 1 C | 2 | 3 | 4 |
|---|---|---|---|---|
| Reactor 1 | | | | |
| Ethylene feed (kg/hr) | — | 45 | 40 | 45 |
| 1-Octene feed (kg/hr) | — | 20 | 60 | 45 |
| Hydrogen feed (g/hr) | — | 0 | 0 | 0.6 |
| Average temp. (° C.) | — | 140 | 155 | 140 |
| Total feed (kg/hr) | — | 380 | 300 | 400 |
| Ti concentration (microM) | — | 0.35 | 1.6 | 1.55 |
| Al/Ti (mol/mol) | — | 80 | 80 | 80 |
| B/Ti (mol/mol) | — | 0.65 | 0 | 0.14 |
| Reactor 2 | | | | |
| Ethylene feed (kg/hr) | 80 | 45 | 45 | 45 |
| 1-Octene feed (kg/hr) | 55 | 40 | 55 | 55 |
| Average temp. (° C.) | 163 | 170 | 185 | 177 |
| Total feed (kg/hr) | 703 | 780 | 630 | 730 |
| Ti concentration (microM) | 0.5 | 1.1 | 1.5 | 1.1 |
| Al/Ti (mol/mol) | 100 | 40 | 40 | 40 |
| B/Ti (mol/mol) | 1.2 | 1.2 | 1.2 | 1.3 |

TABLE 2

| Product | 1 C | 2 | 3 | 4 | 5 |
|---|---|---|---|---|---|
| Polymer Properties | | | | | |
| Melt index (I2) | 0.82 | 0.68 | 0.66 | 0.78 | 0.75 |
| Melt flow ratio (I21/I2) | 16.75 | 24.99 | 42.94 | 32.37 | — |
| Stress Exponent | 1.15 | 1.25 | 1.37 | 1.31 | 1.32 |

TABLE 2-continued

| Product | 1 C | 2 | 3 | 4 | 5 |
|---|---|---|---|---|---|
| Density | 0.9166 | 0.9196 | 0.9089 | 0.9138 | 0.919 |
| Mw/Mn | 1.84 | 2.98 | 4.60 | 4.84 | — |

Notes
Products 1 to 4 are from experiments 1–4 (Table 1) and Product 5 is for comparison and is a commercial 1-octene LLDPE sold under the tradename SCLAIR 11 L 1.

Processing Conditions

TABLE 3

| Product | 1-C | 2 | 3 | 4 | 5 |
|---|---|---|---|---|---|
| Processing Conditions | | | | | |
| Output (lb/hr) | 15.3 | 15.3 | 15.1 | 14.9 | 15.2 |
| Melt temp (° C.) | 211 | 210 | 209 | 209 | 210 |
| Head pressure (psi) | 4155 | 3905 | 3210 | 3255 | 3350 |
| Motor load (amps) | 18.9 | 16.8 | 14.9 | 15.2 | 16.9 |

Folm Properties

TABLE 4

| Product | 1-C | 2 | 3 | 4 | 5 |
|---|---|---|---|---|---|
| Film Properties | | | | | |
| Thickness (mil) | 1 | 1 | 1 | 1 | 1 |
| Dart impact (g/mil) | >1000 | 746 | >1000 | >1000 | 236 |
| MD tear resistance (g/mil) | 246 | 413 | 345 | 456 | 452 |
| TD tear resistance (g/mil) | 340 | 526 | 436 | 520 | 594 |
| Haze (%) | 4 | 5.1 | 4.7 | 2.6 | 8.2 |
| 45° gloss | 78.6 | 74.8 | 67 | 80.3 | 65.5 |

The comparative LLDPE of experiment 1-C has a very narrow molecular weight distribution, or "MWD" (where MWD=$^{Mw}/_{Mn}$). The inventive LLDPE resins from experiments 2 to 4 have MWD values between 2.98 to 4.84 (versus 1.84 for 1-C). The comparative and inventive LLDPE's were then used to prepare monolayer polyethylene films.

The films were manufactured on a conventional blown film line which was fed by a single screw extruder having a 1.5 inch screw diameter. The extruder was driven by an electrical motor. Conventional additives (antioxidants and process aid) were added to all extrusions. The extrudate was forced through a circular die having a three inch diameter and a 35 mil die gap. A blow up ratio of 2.5:1 was used to prepare the film. Other processing conditions (output, head pressure and motor load) are shown in Table 3. Film was also prepared from a conventional, commercially available LLDPE ("Product 5") is to illustrate the processing conditions for a conventional LLDPE resin and the physical properties of the resulting monolayer film. Referring to Table 3, it can be seen that the power demand required to drive the extruder is expressed as a 16.9 amp load (on the motor) to produce a film output of 15.2 lbs of film per hour.

The electrical demand for the product from experiment 1-C was 18.9 amps for a 15.3 lbs/hr throughput (this higher energy usage is typically experienced when LLDPE having a narrow molecular weight distribution is extruded). Thus, the LLDPE of experiment 1-C has poor "processability" (as indicated by load on the electrical motor) in comparison to the commercially available LLDPE of experiment 5.

The LLDPE's of inventive experiments 2, 3 and 4 have processability which is similar to that of the commercially available LLDPE's. While not wishing to be bound by theory, this desirable result is believed to be caused by the comparatively broad molecular weight distributions of the LLDPE's from experiments 2–4.

Physical properties of the films are shown in Table 4. Table 4 shows the excellent dart impact strength of comparative film 1-C. By comparison, the "conventional" film 5 has low dart impact strength (236 g/ml versus>1000 g/ml). However, the "tear resistances" of the conventional film 5 (both "machine direction" or "MD", tear and "transverse direction" or "TD" tear) are both superior to the tear resistances of film 1-C.

Thus, the film made from the conventional LLDPE (film 5) had inferior dart impact strength, but superior tear resistances from the film made from the narrow molecular weight distribution LLDPE from comparative experiment 1-C.

Surprisingly, the films made from the inventive LLDPE's (films 2, 3 and 4) have both excellent dart impact strength and excellent tear resistances. Thus, the inventive films retain the desirable physical properties of "conventional" films and "narrow molecular weight distribution" films. Accordingly, the inventive LLDPE's may be used to prepare excellent monolayer films. These inventive LLDPE's may also be suitably used in other film compositions (for example as a blind component in a monolayer or multilayer film, or as a layer in a multilayer film).

Even more surprisingly, the highly desirable optical properties (i.e. low "haze" and high "gloss") of the "narrow molecular weight distribution" film 1-C are also exhibited by inventive films 2–4. Most notably, the inventive film 4 has the best optical properties of all the films of Table 3.

What is claimed is:

1. A solution polymerization process characterized by:
A) polymerizing ethylene optionally with one or more $C_{3-12}$ alpha olefins, in solvent in a first stirred polymerization reactor at a temperature of from 80 to 200° C. and a pressure of from 1500 to 5000 psi in the presence of (a) a catalyst which is an organometallic complex of a group 3, 4 or 5 metal, characterized by having at least one phosphinimine ligand; and (b) a cocatalyst which contains an alumoxane; and
B) passing said first polymer solution into a second stirred polymerization reactor and polymerizing ethylene, optionally with one or more $C_{3-12}$ alpha olefins, in said second stirred polymerization reactor in the presence of (a) a catalyst which is an organometallic complex of a group 3, 4 or 5 metal, characterized by having at least one phosphinimine ligand; and (b) a cocatalyst which contains an ionic activator.

2. The process of claim 1 wherein said second polymerization reactor is operated at a higher temperature then said first polymerization reactor.

3. The process of claim 1 wherein said catalyst used in said first reactor is the same as said catalyst used in said second reactor and said catalyst is defined by the formula:

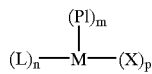

wherein: (a) M is a metal selected from the group consisting of Ti, Hf and Zr; (b) Pi is a phosphinimine ligand defined by the formula:

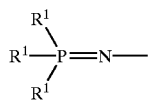

wherein each $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, an amido radical, a silyl radical of the formula:

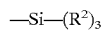

wherein each $R_2$ is independently selected from the group consisting of hydrogen, a $C_{1-8}$ alkyl or alkoxy radical, $C_{6-10}$ aryl or aryloxy radicals, and a germanyl radical of the formula:

wherein $R^2$ is as defined above (c) L is a ligand selected from the group consisting of cyclopentadienyl, substituted cyclopentadienyl, indenyl, substituted indenyl, fluorenyl and substituted fluorenyl; (d) X is an activatable ligand, and wherein: m is 1; n is 1 and p is 2.

4. The process of claim 3 wherein said catalyst is defined such that said m is 1 and Pl is a trialkyl phosphinimine; n is 1 and L is selected from unsubstituted cyclopentadienyl, substituted cyclopentadienyl, unsubstituted indenyl and substituted indenyl; p is 2 and each X is independently selected from (a) an alkyl having from one to ten carbon atoms; or (b) a halide.

5. The process according to claim 4 wherein said catalyst is cyclopentadienyl titanium (tri (tertiary butyl) phosphinimine) dichloride.

* * * * *